Sept. 29, 1964 F. DIAS ETAL 3,151,218

SUPPRESSED-CARRIER AMPLITUDE-MODULATION DETECTOR FOR USE IN AN FM STEREO MULTIPLEX RECEIVER

Original Filed Jan. 14, 1963 2 Sheets-Sheet 1

INVENTORS
Fleming Dias
Jouke Rypkema
By Francis W. Crotty
Atty.

Sept. 29, 1964 F. DIAS ETAL 3,151,218

SUPPRESSED-CARRIER AMPLITUDE-MODULATION DETECTOR FOR USE IN AN FM STEREO MULTIPLEX RECEIVER

Original Filed Jan. 14, 1963 2 Sheets-Sheet 2

INVENTORS
Fleming Dias
Jouke Rypkema
By Francis W. Crotty
Atty.

United States Patent Office 3,151,218

Patented Sept. 29, 1964

3,151,218

SUPPRESSED-CARRIER AMPLITUDE-MODULATION DETECTOR FOR USE IN AN FM STEREO MULTIPLEX RECEIVER

Fleming Dias, Chicago, and Jouke Rypkema, Villa Park, Ill., assignors to Zenith Radio Corporation, Chicago, Ill., a corporation of Delaware Continuation of application Ser. No. 251,407, Jan. 14, 1963. This application Dec. 12, 1963, Ser. No. 331,340
6 Claims. (Cl. 179—15)

The present invention relates, in general, to a wave signal receiver for utilizing a suppressed-carrier amplitude-modulated signal and concerns itself particularly with the detector for such a receiver. Although receivers of this type have a wide range of applications, they are especially suited for producing separated audio signals from a received, frequency modulated stereophonic transmission and, consequently, the invention will be described in that environment. The invention represents a further development of the frequency-modulation receivers described and claimed in copending applications Serial No. 22,830 filed April 18, 1960, Serial No. 118,009 filed June 19, 1961 and Serial No. 222,545 filed September 10, 1962, now Patent No. 3,129,288, all in the name of Adrian J. De Vries and all assigned to the same assignee as the present invention. This application is a continuation of application Serial No. 251,407 filed January 14, 1963 by the same inventors and assigned to the same assignee.

All of the above-mentioned receiver arrangements are suited for the reception of frequency-modulation stereophonic broadcasts conducted in accordance with the specifications of the Federal Communications Commission. Such a broadcast is characterized by a carrier frequency modulated in accordance with a complex or composite modulating function having as one term the sum of the two audio signals and, as another, a subcarrier which has been suppressed-carrier amplitude-modulated by the difference of those two audio signals. The utilization of such a broadcast entails deriving a signal corresponding to the composite modulating function by demodulating the program carrier in a frequency-modulation detector and then operating on that signal to demodulate the amplitude-modulated subcarrier and develop the two audio signals separated from one another. The copending applications alluded to represent various approaches to this problem of demodulation.

Application Serial No. 22,830 discloses a synchronous demodulator which may include a beam deflection tube for deriving the two audio signals of the stereophonic broadcast. That application makes clear that one audio signal may be recovered in the load circuit of one of the two anode segments of a beam deflection tube while the other audio signal may be derived from the load circuit of the remaining anode segment. In each case, however, there is also developed in the anode load circuits a certain amount of unwanted signal component which may be cancelled out by matrixing, for example with a signal derived from a cathode load of the deflection-tube demodulator.

Application Serial No. 118,009 discloses a synchronous demodulator, employing a pair of diodes, in which the two audio signals are developed by operating upon the signal output of the frequency-modulator detector of the receiver and in which clean separation of the audio signals is accomplished by matrixing. The matrixing signal is obtained from the frequency-modulation detector or some subsequent stage of the receiver which has been arranged to provide an output of the appropriate polarity.

Application Serial No. 222,545 discloses in one embodiment a demodulator which employs a pair of transistors for demodulating the amplitude modulated subcarrier containing the difference in formation of the audio signals. A phase reversed and amplified form of the demodulation components appears in the collector circuits of the transistors so that matrixing may be accomplished directly with the output signal of the frequency modulation detector which provides a composite signal containing all of the transmitted information. This arrangement eliminates the requirement for a phase inverter between the output of the frequency modulation detector and the matrix network or any other circuitry relied on solely to provide a signal of the particular polarity required for matrixing. An alternative form of the receiver of this copending application employs a single symmetrical triode transistor arranged to develop, after proper matrixing, one of the audio signals in one load circuit and the other audio signal in the remaining load circuit.

The present invention is an improvement over the receivers described in the previously mentioned copending applications in that conventional, inexpensive, and unsymmetrical transistors may be employed as the suppressed-carrier amplitude-modulation detector to provide separated audio output signals.

It is a primary object of this invention, therefore, to provide a receiver having a novel suppressed-carrier amplitude-modulation detector.

It is another object of this invention to provide a new and improved broadcast receiver for utilizing monophonic transmission or frequency-modulated stereophonic transmissions complying with current signal specifications of the Federal Communications Commission.

It is a specific object of this invention to provide a new and improved suppressed-carrier signal detector which is both efficient and yet inexpensive compared to prior devices.

A receiver constructed in accordance with the invention may be employed for the reception of a stereophonic program comprising a carrier, frequency-modulated in accordance with the sum of two audio signals and also in accordance with a subcarrier signal which has been suppressed-carrier amplitude-modulated with the difference of the two audio signals. When so utilized, the receiver comprises a frequency-modulation detector responsive to the carrier for deriving a composite signal representing the modulation of the carrier and a suppressed-carrier amplitude-modulation detector for operating upon the modulated subcarrier signals. The suppressed-carrier detector includes a single transistor having base, emitter and collector electrodes, having a backward current gain and having a forward current gain substantially greater than the backward current gain. The suppressed-carrier amplitude-modulation detector also includes a pair of load circuits coupled to the emitter and collector electrodes, respectively. A signal source is included in the receiver, having a source impedance less than the impedance of the aforesaid load circuits, for applying at least the suppressed-carrier amplitude-modulated component of the composite signal to the base electrode of the transistor. Additionally, there are means for applying in push-pull relation to the emitter and collector electrodes of the transistor a demodulation signal, corresponding to the carrier frequency of the suppressed-carrier-modulated subcarrier of the composite signal, to develop in the load circuits of the transistor a signal representing the difference of the two audio signals of the stereophonic program. Finally, there are means for matrixing at least that portion of the composite signal representing the sum of the two audio signals with the detected signal representing the difference of these same audio signals to derive a particular one of the audio signals separated from the other.

The features of this invention which are believed to be novel are set forth with particularity in the appended claims. The invention, together with further objects and advantages thereof, may best be understood, however, by reference to the following description taken in conjunction with the accompanying drawings, and in which:

The receiver shown is designed to operate with a monophonic program signal or with a stereophonic program signal conforming to the specifications of the Federal Communications Commission. This signal comprises a carrier which is frequency-modulated in accordance with the sum of two audio signals. The carrier is also frequency-modulated in accordance with a subcarrier signal which has been suppressed-carrier amplitude-modulated with the difference of the same two audio signals. Since the transmission includes a suppressed-carrier component, a pilot signal is also frequency-modulated on the principal carrier to facilitate synchronization of receiving instruments. The program signal may be represented in accordance with the following modulation function:

$$M(t)=K_1(A+B)+K_2(A-B)\ \cos\ \omega_s t+K_3 S' \quad (1)$$

where A and B are the two audio signals and the first term of the function represents their sum. The second term represents the fundamental modulation components of a suppressed-carrier amplitude-modulated subcarrier signal of angular velocity $\omega_s$ conveying the difference information of these audio signals, where the expression "fundamental components" means the first order modulation sidebands which attend the fundamental of the subcarrier and excludes higher order sidebands attendant the harmonics of the subcarrier signal. The fundamental frequency of the subcarrier is designated S and S' is pilot signal of half the frequency of the subcarrier. The symbols $K_1-K_3$ are constants; preferably $K_1$ and $K_2$ are equal and an order of magnitude larger than $K_3$ so that only a small portion, perhaps 10% of the total deviation need be devoted to the transmission of the pilot signal. Preferred forms of a transmitter for developing and transmitting such a program signal are described and claimed in copending applications Serial No. 22,926 filed April 18, 1960, in the name of Robert Adler et al. and Serial No. 23,030 filed on the same date in the name of Carl G. Eilers, both of which applications are assigned to the assignee of the present invention.

Figure 1:
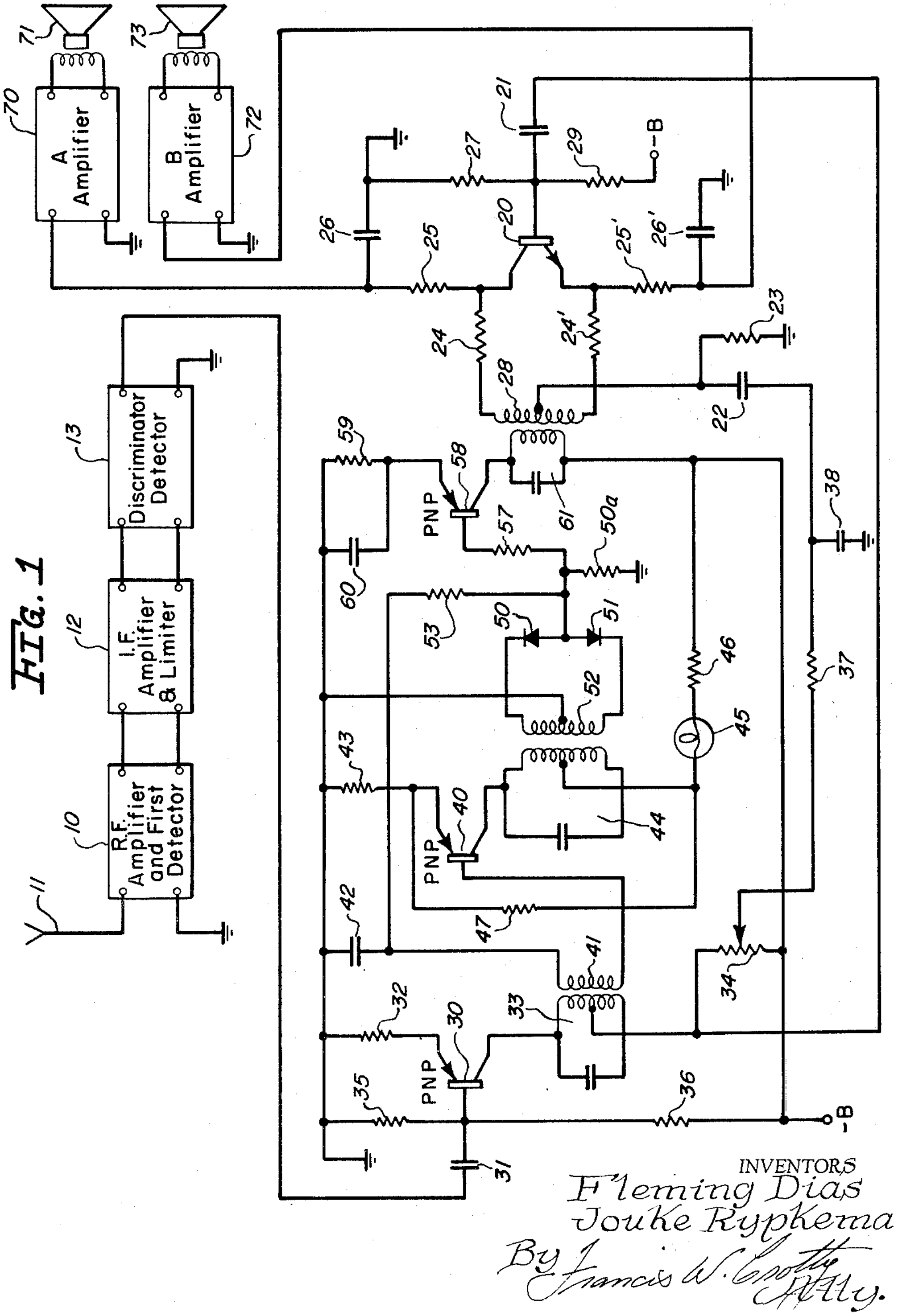
FIGURE 1 is a schematic representation of a receiver embodying the present invention in one form.

The arrangement of FIGURE 1 comprises receiver circuits, which, at least up to the first signal detector, are conventional. They include a radio-frequency amplifier of any desired number of stages and a heterodyning stage or first detector, both being represented by block 10. The input of the amplifying portion connects with a wave-signal antenna 11 and the output connects with a unit 12 which will be understood to include any desired number of stages of intermediate-frequency amplification and one or more amplitude limiters. Following the IF amplifier and limiter 12 is a frequency-modulation detector 13 responsive to the amplitude limited intermediate-frequency signal for developing a composite signal representing the modulation of the receiver carrier. Second detector 13 may be of any well known construction but since a high degree of amplitude limiting is desirable it is convenient that this unit be a ratio detector which exhibits limiting properties. The composite signal developed in the load circuit of detector 13 is defined by the function of Equation 1 and, from the foregoing description of that function, includes a suppressed-carrier amplitude-modulated subcarrier which conveys the difference information of the two audio signals. Complete demodulation of this suppressed-carrier-modulated subcarrier may be accomplished by a detector which includes a single unsymmetrical transistor with base, emitter and collector electrodes and having a backward current gain as well as a forward current gain which, however, is substantially greater than its backward current gain. The term "current gain" is here used to mean that characteristic of a three-element transistor popularly referred to as "beta." In conventional unsymmetrical transistors the forward beta is generally very much greater in magnitude than the backward beta although the back beta is usually more than unity.

More specifically, the amplitude-modulation detector of FIGURE 1 comprises a transistor 20 of the NPN type although its gender is of no particular consequence. Structurally, transistor 20 is of the conventional unsymmetrical variety having base, emitter and collector electrodes and having a pair of load circuits coupled to the emitter and collector, respectively. These load circuits comprise a pair of load resistors 24 and 24', which need not be of equal value, and a center tapped coil 28 which is the secondary of a transformer and has its opposed terminals connected to corresponding terminals of resistors 24, 24'. The emitter and collector electrodes of transistor 20 are returned to ground through de-emphasis networks comprising on one hand, a resistor 25 and a capacitor 26 for one electrode and for the other electrode a resistor 25' and a capacitor 26'. A pair of resistors 27 and 29 are series connected between a bias source —B and ground and their junction connects with the base electrode of transistor 20 to back bias the transistor so that, in the absence of a demodulation signal presently to be described, there is no current flow in the transistor.

The suppressed-carrier amplitude-modulated component of the composite signal developed in demodulator 13 is applied to the base electrode of transistor 20 from a source, having a source impedance less than the impedance of either of the emitter and collector load circuits. To this end, the base electrode is coupled through a capacitor 21 to the high-potential terminal of a potentiometer resistor 34 of an amplifier 30 to be discussed subsequently. Through this connection, potentiometer 34 serves as the low-impedance source of at least the suppressed-carrier component of the composite signal derived from frequency modulation detector 13 for application to the base of transistor 20.

In order to detect the suppressed-carrier amplitude-modulated subcarrier, it is necessary to apply to transistor 20 a demodulation signal which corresponds to the carrier frequency of the subcarrier. The means for applying such a demodulation signal comprises an amplifier tuned to the pilot component of the composite signal derived from detector 13 and a frequency doubler, assuming of course that the pilot is one-half the frequency of the subcarrier. The pilot amplifier is provided by another PNP transistor 30 having a base electrode coupled through a capacitor 31 to the output of detector 13. The emitter is connected to ground through a resistor 32 while the collector connects to a bias source —B through a resonant circuit 33 which is tuned to the pilot frequency and through potentiometer control 34. The base of transistor 30 connects to the junction of a pair of resistors 35 and 36 which are connected across the bias supply and in this fashion, the transistor receives its operating bias.

Amplifier 30 is connected to another tuned amplifier including a similar transistor 40 having a base inductively coupled through a coil 41 to tuned circuit 33 of amplifier 30. The low potential terminal of coil 41 is returned to ground through a capacitor 42. The emitter electrode of transistor 40 is similarly grounded through a resistor 43 while the collector connects to the bias source through a resonant circuit 44 tuned to the pilot frequency and through the series arrangement of an indicator lamp 45 and a resistor 46.

Tuned amplifier 40 drives a frequency doubler comprising a pair of semi-conductor diodes 50, 51 connected across the opposite terminals of a coil 52 which is inductively coupled to resonant circuit 44. The junction of diodes 50, 51 is returned to ground through a diode load resistor 50*a*. The circuit of diodes 50, 51 is similar to a full wave rectifier and a connection from their junction through a resistor 53 to the low potential terminal of coil 41 constitutes a regenerative feedback connection for amplifier 40. That amplifier is normally biased to cut-off because of the potential applied to its emitter through lamp 45, resistor 46 and a resistor 47 connected between lamp 45 and resistor 43. The regeneration afforded by the feedback path through resistor 53 increases the sensitivity and gain of the amplifier in the presence of a pilot carrier which has an amplitude exceeding the threshhold level of the amplifier. This regenerative feature of the receiver and the lamp 45 for indicating stereophonic operation are essentially the same as that described and claimed in copending application Serial No. 118,009, differing principally in that the pilot amplifiers in the subject application are transistorized whereas in the earlier application they are represented as vacuum tube circuits.

Finally, a resistor 57 connects frequency doubler 50, 51 to another tuned amplifier including a transistor 58. The emitter of this transistor is returned to ground through a resistor 59 bypassed by a capacitor 60 while the collector is coupled to the bias supply through a resonant circuit 61 that is tuned to the demodulation or switching signal. In the absence of an output signal from frequency doubler 50, 51, the bias of the base electrode of transistor 58 is very low or zero and the transistor is nearly at cut-off. The inductive coupling of tuned circuit 61 to coil 28 is the circuit means by which the demodulation signal developed in the frequency doubler and amplified in amplifier 58 is applied in push-pull relation to the emitter and collector electrodes of transistor 20 to develop in load circuits 24, 24′ a signal representing the difference of the two audio signals of the stereo program. If desired, one or more of tuned circuits 33, 44 and 61 may be adjustable to facilitate optimum phasing of the demodulation signal.

Since the signals developed across load resistors 24, 24′ represent the difference information of the two audio program signals, means are provided for matrixing therewith at least that portion of the output signal of detector 13 which represents the sum of the audio program signals in order to derive the audio program signals separated from one another. To that end, a matrixing signal is applied by way of the adjustable tap of potentiometer 34, filter resistor 37 and capacitor 38, a capacitor 22 and a resistor 23 to the center tap of coil 28. Through this connection a matrix signal of readily adjustable amplitude is applied concurrently to both load resistors 24, 24′ as required to obtain cleanly separated A and B audio signals as will be discussed presently.

The separated A audio signal developed in the circuit of load resistor 24 of amplitude-modulation detector 20 is applied to the input of an A audio amplifier 70 which is coupled to drive a loudspeaker 71. Similarly, the B audio signal developed in the circuit of the remaining load resistor 24′ of detector 20 is delivered to the input of a B audio amplifier 72 which drives a loudspeaker 73. The speakers are arranged spacially to develop a stereophonic pattern in the area that they serve.

In considering the operation of the described receiver, it will be assumed initially that no signals are intercepted by antenna 11. In this no-signal condition, amplifiers 40 and 58, frequency doubler 50, 51 and amplitude detector 20 are all substantially non-conductive whereas amplifier 30 is conditioned to accept and amplify the pilot signal component of the stereophonic program signal should such signal be received. For the assumed condition, however, there is no output obtained from the receiver.

Let it now be assumed that the receiver is tuned to intercept a stereophonic program signal. That signal is translated in the customary fashion to frequency-modulation detector 13 which, in response thereto, produces a composite signal corresponding to the modulation of the received carrier. The audio frequency information of that composite signal, as indicated in Equation 1, is the sum of the two program signals. Their difference is the modulation of the suppressed-carrier amplitude-modulated subcarrier or the second term of Equation 1. This composite signal is delivered through capacitor 31 to amplifier 30 and is amplified in the usual way. The pilot component is transferred to tuned amplifier 40 for further amplification and then to frequency doublers 50 and 51. The output of the frequency doubler is fed back through resistor 53 and the direct current voltage component of the output increases the sensitivity of amplifier 40 and therefore increases the amplitude of the demodulation signal developed through the frequency multiplication. This demodulation signal is in turn amplified in amplifier 58 and supplied in push-pull relation to amplitude demodulator 20.

At the same time, as conduction in transistor 40 increases due to the regenerative effect, its collector current builds up and indicator lamp 45 turns on, indicating stereophonic reception. Additionally, the composite signal from detector 13 is applied through amplifier 30 to the base electrode of transistor 20 and the suppressed-carrier-modulated component thereof is detected under the influence of the demodulation signal concurrently applied to the emitter and collector electrodes from the frequency-doubler chain.

During half-cycles of one polarity, specifically negative polarity, of the demodulation signal, the emitter electrode has the polarity required for it to function as an emitter. In each such interval, there occurs between emitter and base electrodes an action that is similar to diode action and the modulation components of the modulated subcarrier are developed in load resistor 24′. At the same time the collector electrode, which instantaneously has the opposite polarity of the demodulation signal, functions as an output electrode. The detected modulation components are transferred from the emitter to the collector circuit and, in usual transistor operation, experience a polarity reversal. As a consequence, the collector develops in its load circuit a reversed polarity replica of the signal developed in the load circuit of the emitter electrode. On opposite polarity half-cycles of the demodulation signal, the functions of the emitter and collector electrodes are reversed and now the emitter electrode functions as the output electrode. Through this demodulation process one of the load circuits, for example resistor 24, develops the difference information of the two audio signals in one polarity while the other load resistor 24′ develops the same difference information but in opposite polarity.

The matrix connection through capacitor 22 supplies the sum of the two audio signals to these load circuits in such amplitude as required to accomplish matrixing to the end that one load circuit develops cleanly separated A audio information while the other develops cleanly separated B audio information for respective application through de-emphasis networks 25, 26 and 25′, 26′ to amplifiers 70, 72 and speakers 71, 73. The matrix operation need not be accomplished in detector 20 although that lends to simplicity; it may be carried out in a subsequent stage if desired.

As thus far explained, the operation of amplitude detector 20 is the same as that obtained with a symmetrical transistor as described in copending application Serial No. 222,545 referred to above.

Figure 2:
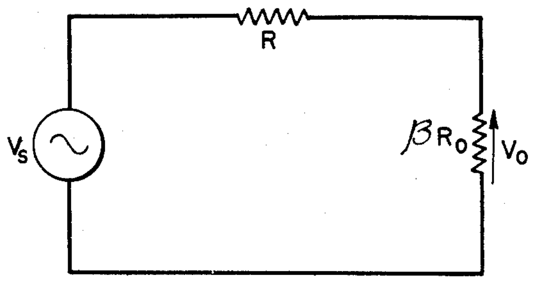
FIGURE 2 is a simplified schematic diagram used in describing the operation of the amplitude-modulation detector of the receiver of FIGURE 1.

In accordance with the invention, a single unsymmetrical transistor 20 may be utilized to provide equal level audio outputs in its two load circuits irrespective of the backward and forward betas of the transistor. For either half cycle of the demodulation signal, the base input circuit of detector 20 may be viewed as the simple series circuit shown in FIGURE 2 wherein source $V_s$ represents the voltage produced across potentiometer 34 of FIGURE 1; resistor $R_s$ is equivalent to the total effective resistance looking from the base of transistor 20 into potentiometer 34; $R_o$ represents either of load resistors 24, 24'; while $V_o$ is to the signal voltage developed across resistor $R_o$. The betal or B is equivalent to either the forward current gain or backward current gain of the transistor depending on which half cycle of operation is being considered. The total impedance presented to source $V_s$ is its source impedance $R_s$ in series with beta times the instantaneously effective one of load resistors 24, 24'. Using conventional voltage division techniques, it may be shown that $$V_o=\frac{KV_sBR_o}{R_s+BR_o} \qquad (2)$$

where K is a proportionality factor. When the second term of the denominator is sufficiently greater than the source impedance $R_s$, which may be accomplished by choice of $R_o$, $\beta$ or both, Equation 2 reduces to $$V_o=\frac{KV_sBR_o}{BR_o}=KV_s \qquad (3)$$

Consequently, by satisfying the above-described impedance relationships, the signal $V_o$ developed in load resistor $R_o$ is independent of the beta of the transistor for either forward or backward conduction and equal outputs are then obtained from the two load circuits of an asymmetrical transistor.

It is appropriate to comment on other properties of the described amplitude-modulation detector which make its use in a frequency-modulation stereophonic system very attractive. An audio signal applied to the transistor is converted into a modulated signal upon its translation through the transistor and does not appear as audio at the output electrode. Hence any audio interference components attributable to storecasting or any other auxiliary source which may be accommodated by the stereophonic channel do not appear in the output load circuits. The same is true for audible noise which may be present in the output of frequency-modulation detector 13. Further, it is found that undesired modulation on the demodulation signal supplied by the frequency doubler does not contribute significantly to the output from detector 20. Hence the detector is a double-sideband suppressed-carrier amplitude modulation detector having certain properties of a balanced demodulator in that the output signal does not contain any input signal frequencies.

Filter 37, 38 in the matrix connection is a low pass filter with a cut-off frequency above the audio range and yet below the fundamental of the difference-modulated subcarrier. Accordingly, the matrix signal comprises only the sum of the audio program signals which, it has been determined, increases the efficiency of recovery of the A and B signals.

Of course, the receiver is a two-mode arrangement because it handles monophonic as well as stereophonic transmissions. Where the received signal is a monophonic broadcast, the output of detector 13 is supplied directly from amplifier 30, through the tap of potentiometer 34, resistors 24 and 24', de-emphasis networks 25, 26 and 25', 26' to amplifiers 70, 72 which now receive identical program signals. As pointed out above, in this absence of a pilot signal which identifies a stereophonic broadcast the frequency-doubler is inactive and amplitude demodulator 20 is cut-off.

Figure 3:
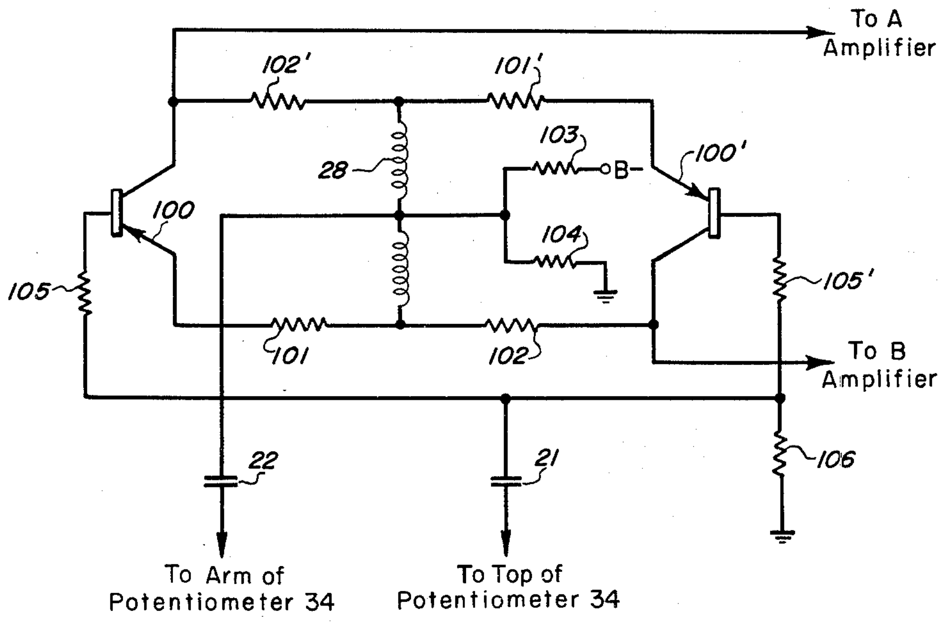
FIGURE 3 is a schematic representation of an alternative form of the amplitude-modulation detector of the receiver of FIGURE 1.

In the embodiment of FIGURE 3, two inexpensive, unmatched, unsymmetrical transistors 100 and 100' are employed in the amplitude-modulation detector network which produces separated audio information without the need of supplying reversed polarity composite signals. Each transistor has an emitter load resistor 101, 101' and a collector load resistor 102, 102'. Each collector is biased by way of a series arrangement of resistors 103, 104 which are coupled between ground and a source of B— voltage. The junction of these resistors is coupled to a center tapped winding or coil 28 which, in turn, is coupled to load resistors 102 and 102' to supply the bias voltage to the collectors. Each transistor has its base electrode coupled to a relatively high impedance 105, 105' and is returned to ground through a common resistor 106. The capacitor 21 is coupled to base resistors 105, 105' and, when this arrangement is used in place of detector 20 in FIGURE 1, also to top of potentiometer 34. This connection applies the suppressed-carrier amplitude-modulated component of the stereophonic transmission to the base electrodes. The matrix signal may be applied to the center of coil 28 by way of capacitor 22 which is to be coupled to the arm of potentiometer 34. Signal de-emphasis may be provided in the same manner shown in FIGURE 1. Coil 28 also serves as means for applying the demodulation signal in push-pull relation to the collector electrodes of the transistors to cause the collector electrodes to be effective in alternation and develop in load circuits 102, 102' a signal representing the difference of the two audio program signals.

With the arrangement of FIGURE 3, load resistor 102 develops the difference of the audio signals of one polarity during half cycles of one polarity of the demodulation signal presented through coil 28 and resistor 102' develops the difference signal of the opposite polarity during the alternate half cycles. Matrixing is again provided by way of the adjustment of potentiometer 34. As in the previous case, the magnitude of the demodulated signals is independent of the forward and backward betas of the two transistors. With the described arrangement, only the forward beta of each transistor is of importance because resistors 105, 105' are of a large value when compared to the impedance of signal source 34. This impedance relationshilp is necessary because for one half cycle of operation conduction of one transistor in its backward direction, while the other is conducting in its forward direction, would cause definite signal attentuation at the base input. As there is no conduction in the backward direction, the backward betas of transistors 100, 100' are of no importance, and, as a feature of the invention, their forward betas need not be matched so long as load resistors 102, 102' are greater than the source impedance because the circuit operates in a manner analogous to that explained in conjunction with the detector of FIGURE 1. The resulting audio signal developed in load circuits 102, 102' is independent of the magnitude of the forward beta of either transistor. Consequently, two conventional, inexpensive transistors having unequal forward beta characteristics may be employed to provide substantially equal level audio output signals.

By way of illustration but in no sense by way of limitation, the following component values were used in the amplitude-modulation detector of FIGURE 1:

| | | |
|---|---|---|
| Resistors 24, 24', 37 | ohms | 5,000 |
| Resistors 25, 25' | do | 100,000 |
| Resistors 23, 27 | do | 15,000 |
| Resistor 29 | do | 120,000 |
| Resistor 34 | do | 2,000 |
| Resistor 50a | do | 10,000 |
| Capacitors 21, 22 | microfarads | 2 |
| Capacitors 26, 26' | micromicrofarads | 750 |
| Capacitor 38 | microfarads | 0.003 |
| Transistor 20 type npn | | 2N1302 |
| Transistor 100 type | | 2M372 |
| Transistor 100' type | | 2N1372 |

Thus, the invention provides in one form a new and improved amplitude-modulation detector which is efficient and employs a conventional transistor having unsymmetrical characteristics. In an alternative embodiment, two transistors which need not be matched or have symmetrical characteristics may be employed to provide equal level output signals. Either arrangement allows the use of relatively inexpensive conventional transistors in an amplitude-modulation detector.

While particular embodiments of the present invention have been shown and described, it is apparent that changes and modifications may be made therein without departing from the invention in its broader aspects. The aim of the appended claims, therefore, is to cover all such changes and modifications as fall within the true spirit and scope of the invention.

We claim:

1. A receiver for using a stereophonic program comprising a carrier frequency-modulated in accordance with the sum of two audio signals and also in accordance with a subcarrier signal which has been suppressed-carrier amplitude-modulated with the difference of said two audio signals, said receiver comprising:

a frequency-modulation detector responsive to said carrier for deriving a composite signal representing the modulation of said carrier;

a suppressed-carrier amplitude-modulation detector including a single transistor having base, emitter and collector electrodes, having a backward current gain, and having a forward current gain substantially greater than said backward current gain;

said amplitude-modulation detector further including a pair of load circuits coupled to said emitter and collector electrodes, respectively;

a signal source, having a source impedance less than the impedance of said load circuits, for applying at least the suppressed-carrier amplitude-modulated component of said composite signal to said base electrode of said transistor;

means for applying in push-pull relation to said emitter and collector electrodes of said transistor a demodulation signal corresponding to the carrier frequency of said subcarrier signal of said composite signal to develop in said load circuits a detected signal representing the difference of said two audio signals;

and means for matrixing at least that portion of said composite signal which represents the sum of said two audio signals with said detected signal representing the difference of said two audio signals to derive a particular one of said audio signals separated from the other of said audio signals.

2. A receiver for using a stereophonic program comprising a carrier frequency-modulated in accordance with the sum of two audio signals and also in accordance with a subcarrier signal which has been suppressed-carrier amplitude-modulated with the difference of said two audio signals, said receiver comprising:

a frequency-modulation detector responsive to said carrier for deriving a composite signal representing the modulation of said carrier;

an amplitude-modulation detector including a single transistor having base, emitter and collector electrodes, having a backward current gain, and having a forward current gain substantially greater than said backward current gain;

said amplitude-modulation detector further including a pair of load circuits coupled to said emitter and collector electrodes, respectively;

a signal source, having a source impedance less than the impedance of said load circuits, for applying at least the suppressed-carrier amplitude-modulated component of said composite signal to said base electrode of said transistor;

means for applying in push-pull relation to said emitter and collector electrodes of said transistor a demodulation signal corresponding to the carrier frequency of said subcarrier signal of said composite signal to develop in said load circuits a detected signal representing the difference of said two audio signals;

and means for applying to each of said load circuits at least the portion of said composite signal representing the sum of said two audio signals to matrix with said detected signal representing the difference of said two audio signals to derive in each of said load circuits a particular one of said audio signals separated from the other.

3. A receiver for using a stereophonic program comprising a carrier frequency-modulated in accordance with the sum of two audio signals and also in accordance with a subcarrier signal which has been suppressed-carrier amplitude-modulated with the difference of said two audio signals, said receiver comprising:

a frequency-modulation detector responsive to said carrier for deriving a composite signal representing the modulation of said carrier;

a suppressed-carrier amplitude-modulation detector including a single asymmetrical transistor having base, emitter and collector electrodes, and having a pair of load circuits coupled to said emitter and collector electrodes, respectively;

a signal source, for applying at least the suppressed-carrier amplitude-modulated component of said composite signal to said base electrode of said transistor;

means for applying in push-pull relation to said emitter and collector electrodes of said transistor a demodulation signal corresponding to the carrier frequency of said subcarrier signal of said composite signal to develop in said load circuits a detected signal representing the difference of said two audio signals;

and means for matrixing at least that portion of said composite signal which represents the sum of said two audio signals with said detected signal representing the difference of said two audio signals to derive a particular one of said audio signals separated from the other of said audio signals the impedance $Z_s$ of said signal source being small compared to the product of $R_o\beta$, where $R_o$ is the impedance of the instantaneously effective one of said load circuits and $\beta$ is the instantaneous current gain of said transistor.

4. A receiver for using a stereophonic program comprising a carrier frequency-modulated in accordance with the sum of two audio signals and also in accordance with a subcarrier signal which has been suppressed-carrier amplitude-modulated with the difference of said two audio signals, said receiver comprising:

a frequency-modulation detector responsive to said carrier for deriving a composite signal representing the modulation of said carrier;

a suppressed-carrier amplitude-modulation detector including a single transistor having base, emitter and collector electrodes, having a backward current gain greater than unity, and having a forward current gain substantially greater than said backward current gain;

said amplitude-modulation detector further including a pair of load circuits coupled to said emitter and collector electrodes, respectively;

a signal source, having a source impedance less than the impedance of said load circuits, for applying at least the suppressed-carrier amplitude-modulated component of said composite signal to said base electrode of said transistor;

means for applying in push-pull relation to said emitter and collector electrodes of said transistor a demodulation signal corresponding to the carrier frequency of said sub-carrier signal of said composite signal to develop in said load circuits a detected signal representing the difference of said two audio signals;

and means for matrixing at least that portion of said composite signal which represents the sum of said two audio signals with said detected signal representing the difference of said two audio signals to derive a particular one of said audio signals separated from the other of said audio signals.

5. A receiver for using a stereophonic program comprising a carrier frequency-modulated in accordance with the sum of two audio signals and also in accordance with a subcarrier signal which has been suppressed-carrier amplitude-modulated with the difference of said two audio signals, said receiver comprising:
  a frequency-modulation detector responsive to said carrier for deriving a composite signal representing the modulation of said carrier;
  an amplitude-modulation detector including two transistors each having base, emitter and collector electrodes and each having a load circuit coupled to said emitter and collector electrodes, respectively;
  means coupled to said frequency-modulation detector, having an impedance small compared to that of said load circuits, for applying at least the suppressed-carrier amplitude-modulated component of said composite signal to said base of said transistors;
  means for applying in push-pull relation to said collector electrodes of said transistors a demodulation signal corresponding to the carrier component of said subcarrier signal of said composite signal to develop in said load circuits a signal representing the difference of said two audio signals;
  and means for matrixing at least the portion of said composite signal representing the sum of said two audio signals with said signal representing the difference of said two audio signals to derive said audio signals separated from the other.

6. A receiver for using a stereophonic program comprising a carrier frequency-modulated in accordance with the sum of two audio signals and also in accordance with a subcarrier signal which has been suppressed-carrier amplitude-modulated with the difference of said two audio signals, said receiver comprising:
  a frequency-modulation detector responsive to said carrier for deriving a composite signal representing the modulation of said carrier;
  a suppressed-carrier amplitude-modulation detector including a single transistor having base, emitter and collector electrodes, having a backward current gain, and having a forward current gain substantially greater than said backward current gain;
  said amplitude-modulation detector further including a pair of load circuits coupled to said emitter and collector electrodes, respectively;
  a signal source, having a source impedence less than the impedance of said load circuits, for applying at least the suppressed-carrier amplitude-modulated component of said composite signal to said base electrode of said transistor;
  means for applying in push-pull relation to said emitter and collector electrodes of said transistor a demodulation signal corresponding to the carrier frequency of said subcarrier signal of said composite signal to develop in said load circuits a detected signal representing the difference of said two audio signals;
  and means for matrixing only that portion of said composite signal which represents the sum of said two audio signals with said detected signal representing the difference of said two audio signals to derive a particular one of said audio signals separated from the other of said audio signals.

No references cited.